United States Patent
Congdon et al.

(10) Patent No.: US 11,566,655 B2
(45) Date of Patent: Jan. 31, 2023

(54) BOLT RETAINER CONFIGURATION TO HOLD A POSITION OF A BOLT WITHIN A COMPONENT

(71) Applicant: Caterpillar Inc., Peoria, IL (US)

(72) Inventors: Thomas Marshall Congdon, Dunlap, IL (US); Nathan Bjerke, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 282 days.

(21) Appl. No.: 16/796,358

(22) Filed: Feb. 20, 2020

(65) Prior Publication Data

US 2021/0262513 A1    Aug. 26, 2021

(51) Int. Cl.
  *F16B 21/18*   (2006.01)
  *F16B 37/08*   (2006.01)
  *E02F 9/28*    (2006.01)
  *F16B 41/00*   (2006.01)

(52) U.S. Cl.
  CPC ........ *F16B 37/0842* (2013.01); *E02F 9/2833* (2013.01); *F16B 41/002* (2013.01)

(58) Field of Classification Search
  CPC .... F16B 41/002; F16B 37/0842; F16B 21/18; F16B 21/00; E02F 9/2833
  USPC ........ 411/148, 133, 136, 109, 353, 107, 352
  See application file for complete search history.

(56) References Cited

U.S. PATENT DOCUMENTS

| | | | | |
|---|---|---|---|---|
| 3,414,154 A | * | 12/1968 | Rose | H02G 3/185 220/3.7 |
| 3,428,344 A | * | 2/1969 | Strange | F16D 1/0835 403/365 |
| 6,174,118 B1 | * | 1/2001 | Rebers | F16B 39/14 411/352 |
| 6,379,093 B1 | * | 4/2002 | Bondarowicz | F16B 21/18 411/525 |
| 6,582,171 B2 | * | 6/2003 | Bondarowicz | F16B 21/18 411/525 |
| 6,595,734 B2 | | 7/2003 | Duran et al. | |
| 7,059,022 B2 | * | 6/2006 | Yuta | F16B 19/008 24/297 |
| 7,877,948 B2 | | 2/2011 | Davies et al. | |
| 8,057,122 B2 | * | 11/2011 | Schneider | F16B 41/002 411/107 |
| 8,210,784 B2 | | 7/2012 | Hartmann et al. | |
| 8,740,530 B2 | | 6/2014 | Cosenza et al. | |
| 9,989,081 B2 | * | 6/2018 | Slepecki | F16B 13/12 |
| 10,240,625 B2 | * | 3/2019 | Schneider | F16B 21/183 |
| 2002/0009351 A1 | * | 1/2002 | Bondarowicz | F16B 21/18 411/353 |

(Continued)

FOREIGN PATENT DOCUMENTS

CA    2641066    8/2007
CN    201390218 Y    1/2010

(Continued)

*Primary Examiner* — Gary W Estremsky
(74) *Attorney, Agent, or Firm* — Harrity & Harrity LLP

(57) ABSTRACT

A bolt retainer, to position a bolt within a bolt receiving element of a component, is disclosed. The bolt retainer may include a tube structure. The bolt retainer may further include bolt engaging elements that extend from an inner surface of the tube structure to engage with the bolt. The bolt retainer may additionally include component engaging elements that extend from an outer surface of the tube structure to engage with the component.

12 Claims, 4 Drawing Sheets

(56) References Cited

U.S. PATENT DOCUMENTS

| | | | | |
|---|---|---|---|---|
| 2003/0108401 A1* | 6/2003 | Agha | ................. | F16B 43/00 |
| | | | | 411/353 |
| 2003/0194292 A1* | 10/2003 | Deeg | ................. | F16B 41/002 |
| | | | | 411/353 |
| 2006/0228193 A1* | 10/2006 | Apsey | ................. | F16B 19/02 |
| | | | | 411/34 |
| 2009/0022566 A1* | 1/2009 | Chretien | ................. | F16B 43/00 |
| | | | | 411/353 |
| 2009/0317207 A1* | 12/2009 | Hartmann | ................. | F16B 41/002 |
| | | | | 411/361 |
| 2010/0021263 A1* | 1/2010 | Holt | ................. | F16B 5/02 |
| | | | | 16/2.5 |
| 2011/0286813 A1 | 11/2011 | Szczukowski et al. | | |
| 2014/0201975 A1 | 7/2014 | Slepecki et al. | | |
| 2021/0180640 A1* | 6/2021 | Fleckenstein | ................. | F16B 19/02 |

FOREIGN PATENT DOCUMENTS

| | | |
|---|---|---|
| DE | 102009014847 A1 | 10/2010 |
| EP | 3054177 A1 | 8/2016 |
| WO | 2013009804 | 1/2013 |

\* cited by examiner

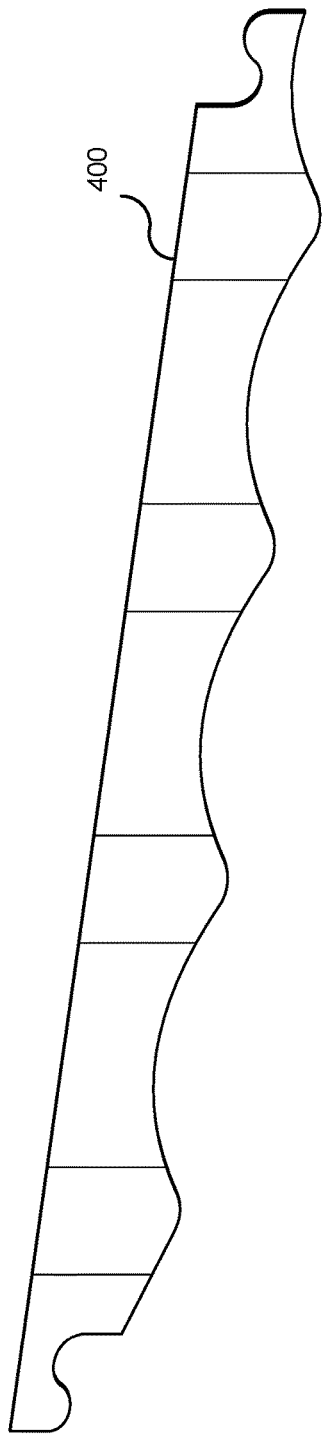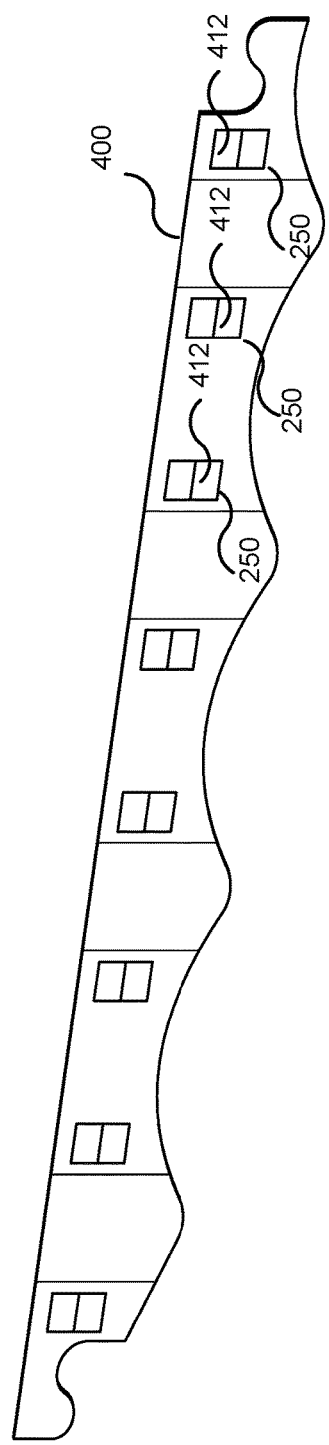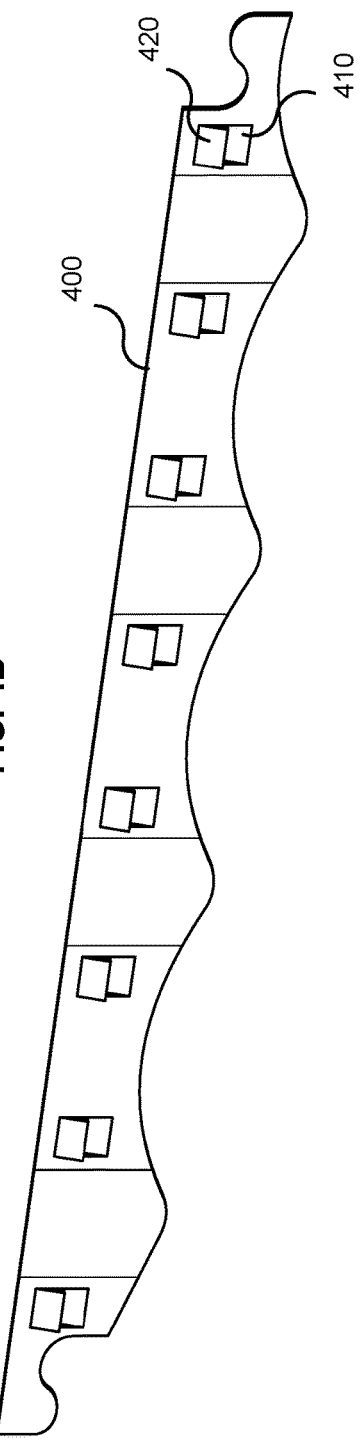

BOLT RETAINER CONFIGURATION TO HOLD A POSITION OF A BOLT WITHIN A COMPONENT

TECHNICAL FIELD

The present disclosure relates generally to a bolt retainer configuration to hold a position of a bolt within a component.

BACKGROUND

Ground engaging tools may be secured in place to a work implement of a machine, such as a mining machine, a construction machine, an earth moving machine, and/or the like. For example, the ground engaging tools may be secured using bolts positioned within the ground engaging tools. In light of the significant size and weight of the work implement and the ground engaging tools, the work implement may be suspended (e.g., using a crane or other suspension mechanism) during the process of securing the ground engaging tools to the work implement. In this regard, securing the ground engaging tools to the work implement may require one or more workers to position the bolts within the ground engaging tools while manually supporting the suspended work implement.

A fastener assembly for installation within a work piece is disclosed in U.S. Pat. No. 8,740,530 issued to Arconic Inc ("the '530 patent"). The '530 patent discloses that the fastener assembly comprises a bolt, a retainer ring, and a housing that houses the retainer ring. The '530 patent further discloses that the housing is positioned at and engages one side of the work piece, while the bolt is inserted into a hole of the work piece on an opposite side thereof. The '530 patent additionally discloses that the retainer ring engages the bolt such that a plurality of pressure pads extending from a plurality of corresponding spring beam elements of the retainer ring reside in an annular groove of the bolt. The '530 patent discloses that the housing captivates the bolt onto the work piece while providing a positive hold out of the bolt.

The bolt retention configuration of the present disclosure solves one or more of the problems set forth above and/or other problems in the art.

SUMMARY

According to some implementations, a bolt retainer, to position a bolt within a bolt receiving element of a component, may comprise a tube structure and bolt engaging elements that extend from an inner surface of the tube structure to engage with the bolt. The bolt retainer may further comprise component engaging elements that extend from an outer surface of the tube structure to engage with the component.

According to some implementations, a pre-installation system may comprise a bolt and a component that is to be mechanically fastened to a receiving structure via the bolt. The bolt may be received through a bolt receiving element of the component. The pre-installation system may further comprise a bolt retainer to retain the bolt within a receiving element of the component. The bolt retainer may comprise a tube structure; bolt engaging elements that extend from an inner surface of the tube structure to engage with the bolt; and component engaging elements that extend from an outer surface of the tube structure to engage with the component.

According to some implementations, a bolt retainer may comprise a tube structure and bolt engaging elements that extend from an inner surface of the tube structure to engage with a bolt. The bolt may be positioned within a component. The bolt engaging elements may be formed from corresponding inward indentations formed on the inner surface of the tube structure. The bolt retainer may further comprise component engaging elements that extend from an outer surface of the tube structure to engage with the component. The component engaging elements may be formed from corresponding outward indentations formed on the outer surface of the tube structure.

BRIEF DESCRIPTION OF THE DRAWINGS

FIGS. 4A-4D are diagrams of an example method of forming a bolt retainer that may be used with the bolts of FIG. 1.

DETAILED DESCRIPTION

This disclosure relates to a bolt retainer configuration to hold a position of a bolt within a component. The bolt retainer configuration has universal applicability to any machine utilizing such a bolt retainer configuration. The term "machine" may refer to any machine that performs an operation associated with an industry, such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or another above ground equipment, underground equipment, or marine equipment. Moreover, one or more implements may be connected to the machine.

Figure 1:
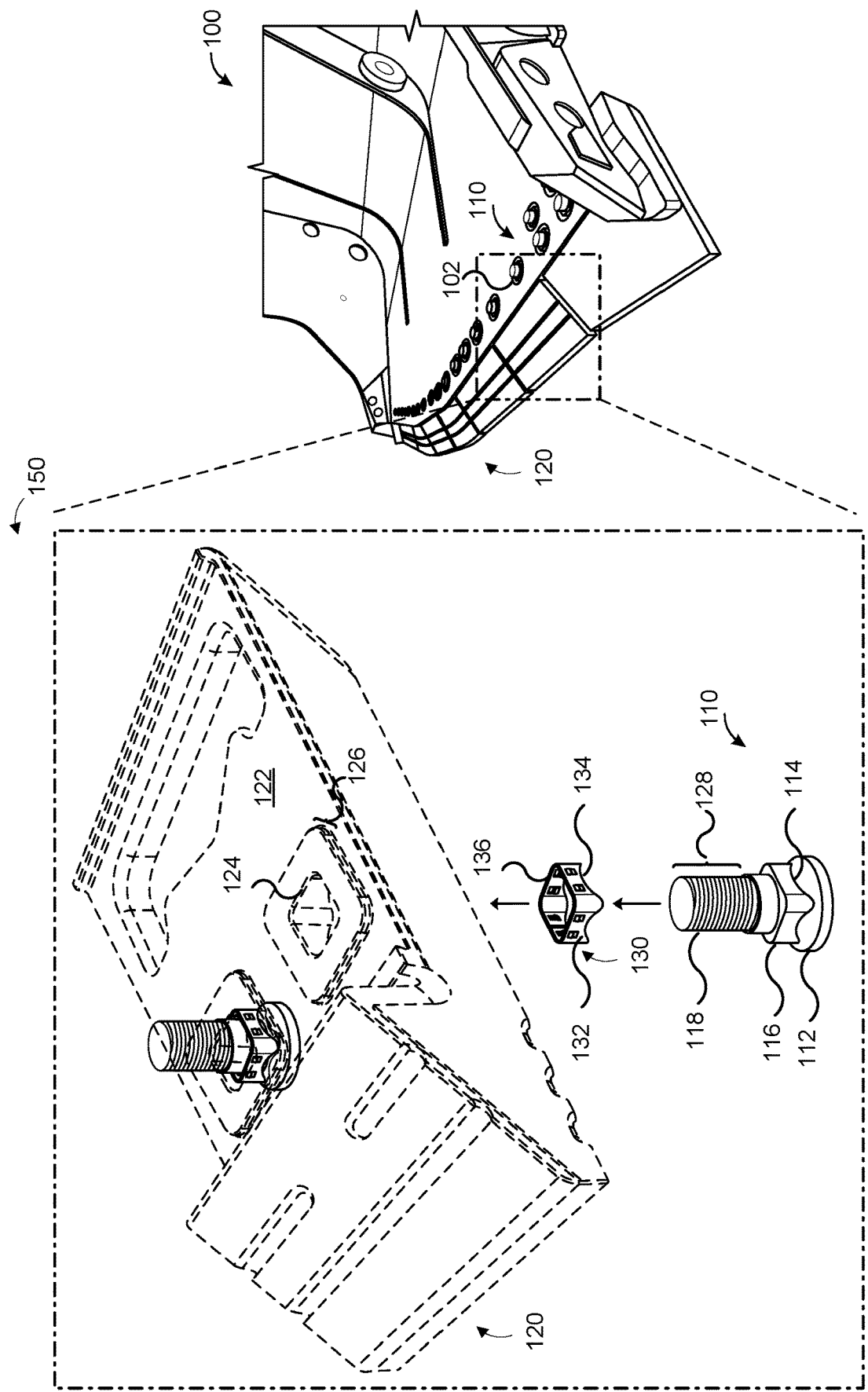
FIG. 1 is a diagram of an example receiving structure to which multiple components are fastened via multiple bolts.

FIG. 1 is a diagram of an example receiving structure to which multiple components are fastened via multiple bolts. As an example, receiving structure 100 may be an implement of a machine. Receiving structure 100 is shown in FIG. 1 as a load bucket but may be any other type of implement. As shown in FIG. 1, one or more bolts 110 secure one or more components 120 to receiving structure 100. For example, each component 120 may be mechanically fastened to receiving structure 100 via one or more bolts 110 received through one or more work implement holes 102.

Component 120 may be configured to perform work on material. As shown in FIG. 1 for example, component 120 is a ground engaging tool, such as a ground engaging tooth. However, component 120 may be any other component that may be secured to receiving structure 100. Component 120 includes an attachment surface 122 that mates with a corresponding surface (not shown) of receiving structure 100. Component 120 also includes one or more bolt receiving elements 124 that may receive one or more bolts 110. Bolt receiving elements 124 may abut attachment surface 122 of component 120. For example, bolt receiving elements 124 may be located on or located proximate to attachment surface 122.

As shown in FIG. 1, bolt 110 includes a head 112, a shoulder line 114 at a base of head 112, a shoulder 116, and a thread component 118. Shoulder 116 may be located between head 112 and thread component 118. In some examples, bolt 110 may include a plow bolt. As shown in FIG. 1, bolt 110 is received through a bolt retainer 130. Bolt 110 is further received through bolt receiving element 124 of component 120, after being received through bolt retainer 130. A portion of bolt 110 may be received through bolt retainer 130 and/or through bolt receiving element 124. For example, thread component 118 of bolt 110 may be received through bolt retainer 130 and/or through bolt receiving element 124. As will be explained in more detail below with respect to FIG. 3, bolt retainer 130 may retain bolt 110 within bolt receiving element 124 of component 120.

As shown in FIG. 1, pre-installation system 150 includes bolts 110, component 120, and bolt retainers 130. As will be apparent from the description herein, by retaining bolts 110 within bolt receiving element 124 using bolt retainers 130 prior to securing component 120 to receiving structure 100, the process of securing component 120 to receiving structure 100 may be improved.

As shown in FIG. 1, bolt retainer 130 includes a tube structure 132. Tube structure 132 includes a bolt head-side end 134 and a bolt tip-side end 136. In some implementations, the dimensions and shape of tube structure 132 may be based on bolt 110 and/or bolt receiving element 124 to permit tube structure 132 to be easily inserted on bolt 110 (e.g., by press-fit over shoulder 116 of bolt 110), thereby facilitating the retention of bolt 110 within component 120. For example, a shape of tube structure 132 may correspond to a shape associated with a perimeter of shoulder 116 of bolt 110. For instance, inner dimensions of the inner surface of tube structure 132 may correspond to dimensions associated with a perimeter of shoulder 116. As another example, the shape of bolt head-side end 134 may be based on a base of head 112. For instance, the shape of bolt head-side end 134 may be configured to match a shape associated with a shoulder line 114 at a base of head 112. As yet another example, a shape of bolt tip-side end 136 may be based on bolt receiving element 124. For instance, the shape of bolt tip-side end 136 may be configured to match a shape associated with a perimeter of bolt receiving element 124. As yet another example, a length of tube structure 132 may be based on a length of bolt 110 and/or a length of bolt receiving element 124. For instance, the length of tube structure 132 may be less than or equal to a thread component length 128 of thread component 118 of bolt 110 and/or a length of bolt receiving element 124 (e.g., a total length of bolt receiving element 124). As an example, the length of tube structure 132 may be less than or equal to a thickness 126 of bolt receiving element 124.

As indicated above, FIG. 1 is provided as an example. Other examples may differ from what was described in connection with FIG. 1.

Figure 2:
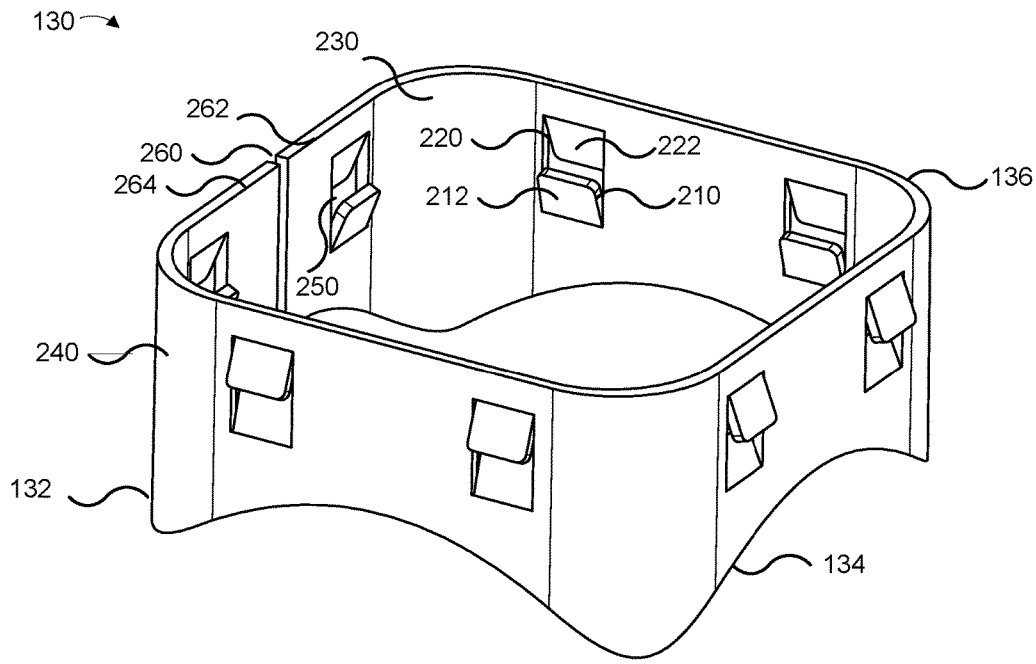
FIG. 2 is a diagram of an example bolt retainer that may be used with the bolts of FIG. 1.

FIG. 2 is a diagram of an example bolt retainer 130 that may be used with the bolts of FIG. 1. As shown in FIG. 2, bolt retainer 130 includes tube structure 132 (described above with respect to FIG. 1), bolt engaging elements 210, and component engaging elements 220. As shown in FIG. 2, bolt engaging elements 210 extend from an inner surface 230 of tube structure 132 to engage with bolt 110. Inner surface 230 may be a non-threaded surface to facilitate insertion of bolt retainer 130 onto bolt 110. For example, the non-threaded surface may enable bolt retainer 130 to be press-fit onto bolt 110, as opposed to being twisted onto bolt 110. Alternatively, inner surface 230 may be configured to enable bolt retainer 130 to be twisted onto bolt 110. In some implementations, bolt engaging elements 210 may be formed from individual inwardly bent tabs 212 of tube structure 132. For example, each one of inwardly bent tabs 212 may be formed on inner surface 230. Bolt engaging elements 210 may be formed from corresponding inward indentations formed on inner surface 230.

As shown in FIG. 2, component engaging elements 220 extend from an outer surface 240 of tube structure 132 to engage with component 120. Component engaging elements 220 may be formed from individual outwardly bent tabs 222 of tube structure 132. For example, each one of outwardly bent tabs 222 may be formed on outer surface 240. In some implementations, component engaging elements 220 may be formed from corresponding outward indentations formed on outer surface 240. As shown in FIG. 2, inwardly bent tabs 212 may be individually paired with corresponding ones of outwardly bent tabs 222 at multiple retention positions 250 of tube structure 132. For example, retention positions 250 may be formed around a circumference of tube structure 132. Retention positions 250 may include individual openings formed between corresponding inwardly bent tabs 212 and outwardly bent tabs 222.

As shown in FIG. 2, tube structure 132 further includes a seam 260 between a first seam end 262 and a second seam end 264 of a sheet of metal (described in more detail with respect to FIGS. 4A-4D) that forms tube structure 132. Seam 260 may be parallel to a longitudinal axis of tube structure 132.

As indicated above, FIG. 2 is provided as an example. Other examples may differ from what was described in connection with FIG. 2.

Figure 3:
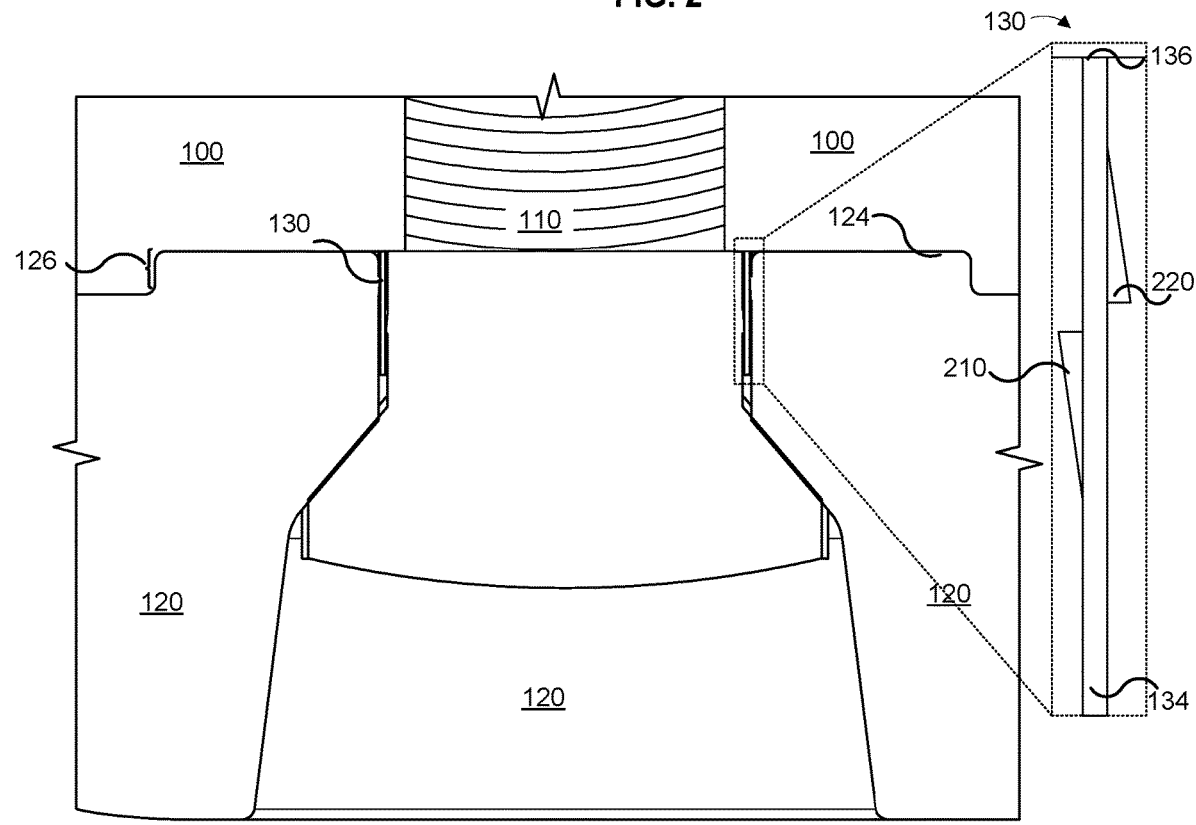
FIG. 3 is a cross-sectional view diagram of the receiving structure of FIG. 1 to which a component of FIG. 1 is fastened via a bolt of FIG. 1.

FIG. 3 is a cross-sectional view diagram of the receiving structure 100 of FIG. 1 to which a component of FIG. 1 is fastened via a bolt of FIG. 1. As shown in FIG. 3, component 120 is mechanically fastened to receiving structure 100 via bolt 110. In some implementations, bolt 110 may be received through bolt retainer 130. In other words, bolt retainer 130 may be inserted on bolt 110. As shown in FIG. 3, bolt engaging elements 210 engage with bolt 110. For example, bolt retainer 130 may be inserted on bolt 110 by being press-fit over bolt 110. For instance, bolt engaging elements 210 may be in an extended state prior to bolt retainer 130 being inserted over bolt 110 and may be in a compressed state while and after being inserted over bolt 110, thereby engaging with bolt 110. Bolt 110 may be received through bolt receiving element 124 of component 120 after being received through bolt retainer 130. As shown in FIG. 3, component engaging elements 220 engage with component 120. For example, component engaging elements 220 may be in an extended state prior to bolt 110 being received through bolt receiving element 124 and may be in a compressed state while and after bolt 110 has been received through bolt receiving element 124, thereby engaging with component 120. As shown in FIG. 3, bolt engaging elements 210 engage with bolt 110 while component engaging elements 220 engage with component 120, thereby securing a position of bolt 110 with component 120. Accordingly, using bolt retainers 130 to retain bolts 110 within component 120 (prior to securing component 120 to receiving structure 100) decreases or eliminates the need to manually support receiving structure 100 (e.g., suspended using a suspension mechanism) when securing component 120 to receiving structure 100. While the disclosure herein is provided with respect to using bolt retainers 130 to retain or secure the positions of bolt 110, the foregoing disclosure may be applicable to using bolt retainers 130 to retain or secure the positions of screws, pins, rivets, fasteners, and/or the like.

As indicated above, FIG. 3 is provided as an example. Other examples may differ from what was described in connection with FIG. 3.

Figure 4D:
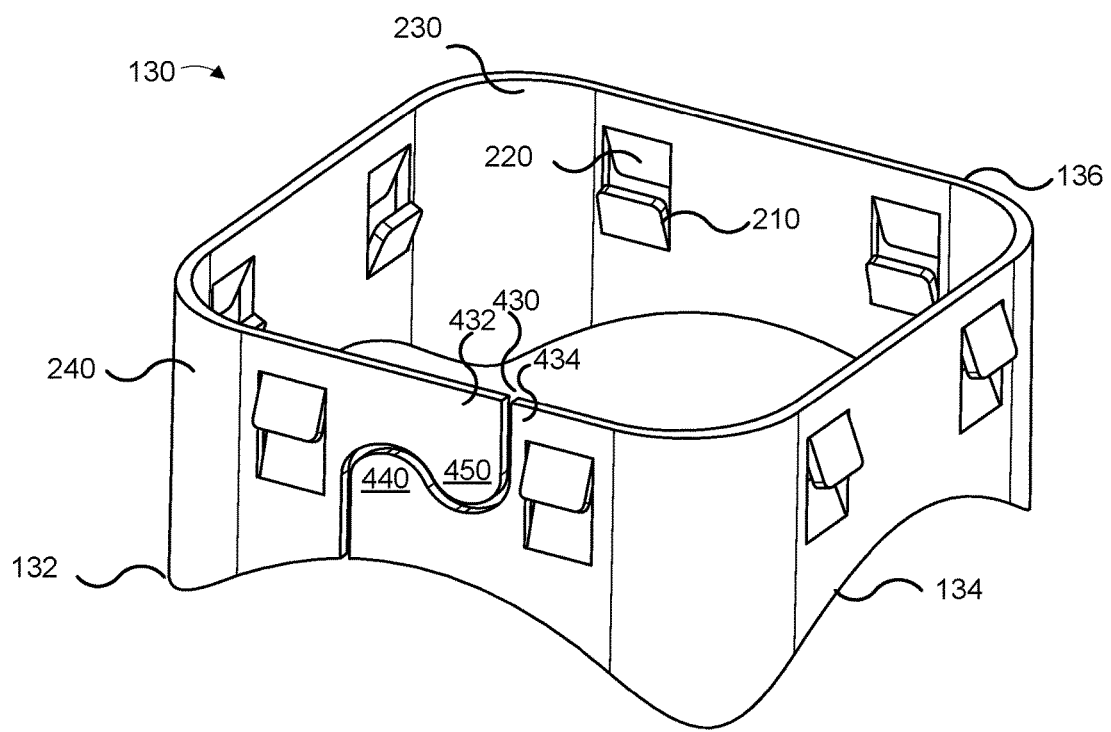

FIGS. 4A-4D are diagrams of an example method of forming a bolt retainer that may be used with the bolts of FIG. 1. In some implementations, forming bolt retainer 130 may include extracting a workpiece from a sheet of metal. As an example, the metal may be steel. For instance, the metal may be spring steel. An example workpiece 400 is illustrated in FIG. 4A. As examples, extracting a workpiece may include stamping the sheet of metal, laser cutting the sheet of metal, flame cutting the sheet of metal, water cutting the sheet of metal, and/or the like. Additionally, or alternatively, forming bolt retainer 130 may include forming bolt engaging elements 210 and component engaging elements 220 on workpiece 400. Bolt engaging elements 210 and component engaging elements 220 may be formed on opposite sides of workpiece 400.

Referring now to FIGS. 4B and 4C, forming bolt engaging elements 210 and component engaging elements 220 on workpiece 400 may include creating H-shape cuts 412 through workpiece 400 to form bolt engaging tabs 410 and component engaging tabs 420. As examples, creating H-shape cuts 412 may include laser cutting workpiece 400, flame cutting workpiece 400, water cutting workpiece 400, and/or the like. As shown in FIG. 4B, H-shape cuts 412 may be created at retention positions 250. Additionally, or alternatively, forming bolt engaging elements 210 and component engaging elements 220 on workpiece 400 may include bending bolt engaging tabs 410 toward a first side of workpiece 400 to form inwardly bent tabs and bending component engaging tabs 420 toward a second side of workpiece 400 (opposite the first side) to form outwardly bent tabs. In other words, bolt engaging tabs 410 become inwardly bent tabs and component engaging tabs 420 become outwardly bent tabs. Additionally, or alternatively, forming bolt engaging elements 210 on workpiece 400 may include stamping the inwardly bent tabs (or bolt engaging tabs 410) toward the first side of workpiece 400 and forming component engaging elements 220 on workpiece 400 may include stamping the outwardly bent tabs toward the second side of workpiece 400.

Forming bolt retainer 130 may include shaping workpiece 400 into tube structure 132 that results in bolt engaging elements 210 being positioned on inner surface 230 of tube structure 132 and component engaging elements 220 being positioned on outer surface 240 of tube structure 132. In some implementations, shaping workpiece 400 into tube structure 132 may include rolling or bending workpiece 400, resulting in a seam 430 in tube structure 132. As shown in FIG. 4D, tube structure 132 may be a non-cylindrical shape. Alternatively, tube structure 132 may be a cylindrical shape.

As shown in FIG. 4D, seam 430 may run from bolt head-side end 134 to bolt tip-side end 136 of tube structure 132. In some implementations, seam 430 may be formed between interlocking components 440 and 450 at seam ends 432 and 434 of workpiece 400, with interlocking components 440 and 450 being configured to receive one another when tube structure 132 is formed. As an example, seam 430 may be a gap between seam ends 432 and 434. The gap (or seam 430) may be based on a dimension of workpiece 400. For example, the gap (or seam 430) may be threshold distance that is less than a portion (or percentage) of workpiece 400. In some implementations, interlocking components 440 and 450 may prevent separation of seam ends 432 and 434. For example, interlocking components 440 and 450 may prevent an increase in distance between seam ends 432 and 434. Additionally, or alternatively, interlocking components 440 and 450 may prevent movement along a longitudinal axis that corresponds to a longitudinal axis of bolt 110. Additionally, or alternatively, interlocking components 440 and 450 may prevent a longitudinal movement of seam ends 432 and 434 in opposite directions. For example, interlocking components 440 and 450 may prevent movement of a first one of seam ends 432 and 434 in a first longitudinal direction and movement of a second one of seam ends 432 and 434 in a second longitudinal direction that is opposite the first longitudinal direction. Additionally, or alternatively, interlocking components 440 and 450 may prevent a twisting of tube structure 132 or workpiece 400.

As indicated above, FIGS. 4A-4D are provided as examples. Other examples may differ from what was described in connection with FIGS. 4A-4D.

Figure 5:
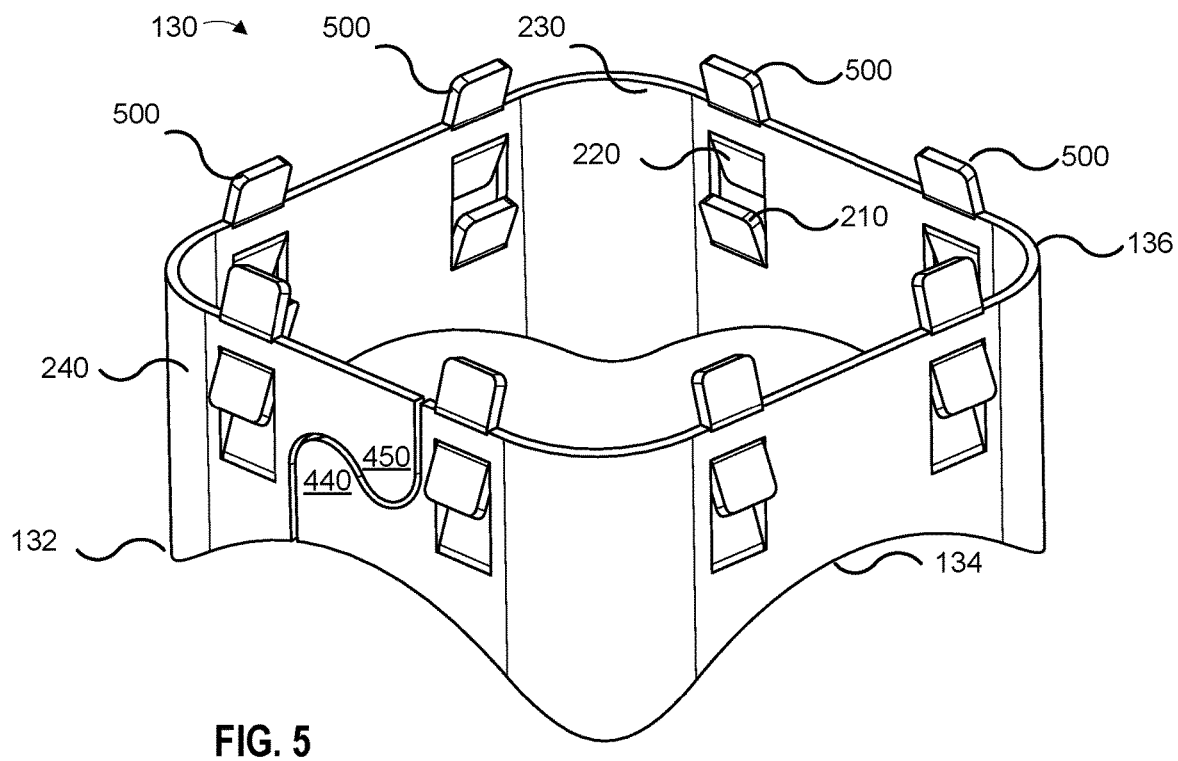
FIG. 5 is a diagram of an example bolt retainer that may be used with the bolts of FIG. 1.

FIG. 5 is a diagram of an example bolt retainer 130 that may be used with the bolts of FIG. 1. The elements of bolt retainer 130 have been described above with respect to FIGS. 4A-4D. As shown in FIG. 5, bolt retainer 130 further includes guiding elements 500. Guiding elements 500 may guide bolt 110 as bolt 110 is received through bolt receiving elements 124. For example, as bolt 110 is being received through bolt receiving element 124, guiding elements 500 may guide bolt 110 to center bolt 110 within bolt receiving element 124. Additionally, as bolt 110 is being received through bolt receiving element 124, guiding elements 500 may retract inwardly to engage with bolt 110.

As shown in FIG. 5, guiding elements 500 are formed on bolt tip-side end 136 of tube structure 132. Guiding elements 500 extend inwardly from bolt tip-side end 136 to engage with bolt 110. Guiding elements 500 may be formed as part of extracting workpiece 400 as discussed above with respect to in FIG. 4A. Additionally, or alternatively, guiding elements 500 may be formed by way of soldering to bolt tip-side end 136. As shown in FIG. 5, positions of guiding elements 500 are individually paired with corresponding positions of bolt engaging elements 210. Additionally, or alternatively, positions of guiding elements 500 may be staggered with respect to positions of bolt engaging elements 210. As shown in FIG. 5, a size and a quantity of guiding elements 500 correspond to a size and a quantity of bolt engaging elements 210. Additionally, or alternatively, a size and/or a quantity of guiding elements 500 may be different than a size and/or a quantity of bolt engaging elements 210.

As indicated above, FIG. 5 is provided as an example. Other examples may differ from what was described in connection with FIG. 5.

INDUSTRIAL APPLICABILITY

The disclosed bolt retainer configuration (e.g., bolt retainer 130) may be used with any bolt in any component to maintain the position of the bolt with the component. The disclosed bolt retainer configuration may be configured to be inserted over a bolt (e.g., by being press-fit over the bolt). The disclosed bolt retainer configuration may include bolt engaging elements (e.g., bolt engaging elements 210) that engage with a bolt and component engaging elements (e.g., component engaging elements 220) that engage with a component while bolt engaging elements engage with the bolt, thereby securing a position of the bolt within the component. The disclosed bolt retainer configuration may further include guiding elements (e.g., guiding elements 500). The guiding elements enable a position of the bolt to be centered within the component. Additionally, the guiding elements may engage with the bolt while the bolt engaging elements engage with the bolt, thereby further securing the position of the bolt within the component.

Several advantages may be associated with the disclosed bolt retainer configuration. For example, using bolt retainers to retain bolts within a component prior to securing the component to a receiving structure may decrease or eliminate the need to manually support the receiving structure when securing the component to the receiving structure. In this case, the receiving structure may be suspended using a suspension mechanism due to the size and weight of the receiving structure. Thus, the installation process of the component on the receiving structure may be improved. For example, the speed of the installation process may be improved by decreasing or eliminating the need to manually support the receiving structure during the installation process. As it may be apparent from the description herein, it is not desirable to position bolts within the component while manually supporting the suspended receiving structure. Furthermore, pre-installing the bolts within the component and using bolt retainers to retain the bolts within the component may improve the accuracy of the installation process of the component on the receiving structure. Furthermore, pre-installing the bolts within the component and using bolt retainers to retain the bolts within a component may reduce the amount of resources for the installation process. For example, the amount of workers typically required for such installation process may be reduced.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A bolt retainer to position a bolt within a bolt receiving element of a component, the bolt retainer comprising:
a tube structure including a first end and a second end opposite the first end,
wherein the tube structure includes a seam between seam ends of a sheet that forms the tube structure, and
wherein the seam includes an interlocking component that prevents at least one of:
separation of the seam ends, or
longitudinal movement of the seam ends in opposite directions;
bolt engaging elements that extend inwardly from an inner surface of the tube structure to engage with the bolt,
wherein the bolt engaging elements are formed from individual inwardly bent cantilevered tabs of the tube structure, and
wherein the bolt engaging elements are formed between the first end and the second end; and
component engaging elements that extend outwardly from an outer surface of the tube structure to engage with the bolt receiving element of the component,
wherein the component engaging elements are formed from individual outwardly bent cantilevered tabs of the tube structure, and
wherein the component engaging elements are formed between the first end and the second end.

2. The bolt retainer of claim 1, wherein the inwardly bent cantilevered tabs are individually paired with corresponding ones of the outwardly bent cantilevered tabs at a plurality of retention positions of the tube structure.

3. The bolt retainer of claim 2, wherein the plurality of retention positions include individual openings formed between the inwardly bent cantilevered tabs and the outwardly bent cantilevered tabs.

4. The bolt retainer of claim 1, wherein the bolt engaging elements are individually paired with corresponding ones of the component engaging elements at a plurality of retention positions that are around a circumference of the tube structure.

5. The bolt retainer of claim 1, wherein the tube structure comprises spring steel, and
wherein the tube structure is shaped to permit the tube structure to be press-fit over a shoulder of the bolt.

6. The bolt retainer of claim 1, wherein the seam is parallel to a longitudinal axis of the tube structure.

7. The bolt retainer of claim 1, wherein the bolt retainer further comprises guiding elements,
wherein the guiding elements are formed on the second end of the tube structure, and
wherein the guiding elements are configured to retract inwardly to engage with the bolt.

8. A bolt retainer comprising:
a tube structure including a first end and a second end opposite the first end,
wherein the tube structure includes a seam between seam ends of a sheet that forms the tube structure, and
wherein the seam includes an interlocking component that prevents at least one of:
separation of the seam ends, or
longitudinal movement of the seam ends in opposite directions;
bolt engaging elements that extend from an inner surface of the tube structure to engage with a bolt,
wherein the bolt is to be positioned within a component,
wherein the bolt engaging elements are formed between the first end and the second end, and
wherein the bolt engaging elements are formed from corresponding inward cantilevered indentations formed on the inner surface of the tube structure; and
component engaging elements that extend from an outer surface of the tube structure to engage with the component,
wherein the component engaging elements are formed between the first end and the second end, and wherein the component engaging elements are formed from corresponding outward cantilevered indentations formed on the outer surface of the tube structure.

9. The bolt retainer of claim 8, further comprising:

guiding elements that extend inwardly from a bolt tip-side end of the of the tube structure.

10. The bolt retainer of claim 8, wherein the bolt comprises a plow bolt.

11. The bolt retainer of claim 8, wherein the bolt engaging elements are formed from individual inwardly bent tabs of the tube structure, wherein the component engaging elements are formed from individual outwardly bent cantilevered tabs of the tube structure, and wherein the inwardly bent tabs are individually paired with corresponding ones of the outwardly bent cantilevered tabs at a plurality of retention positions of the tube structure.

12. The bolt retainer of claim 8, wherein the tube structure comprises spring steel, and wherein the tube structure is shaped to permit the tube structure to be press-fit over a shoulder of the bolt.

\* \* \* \* \*